Oct. 5, 1954 — J. DREESMAN — 2,690,576
MACHINE FOR REMOVING FOREIGN MATERIAL FROM THE OUTER SURFACE OF EGGS
Filed Dec. 13, 1948 — 2 Sheets-Sheet 1
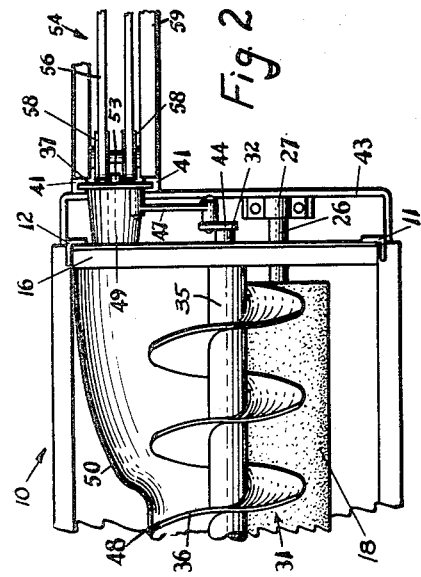
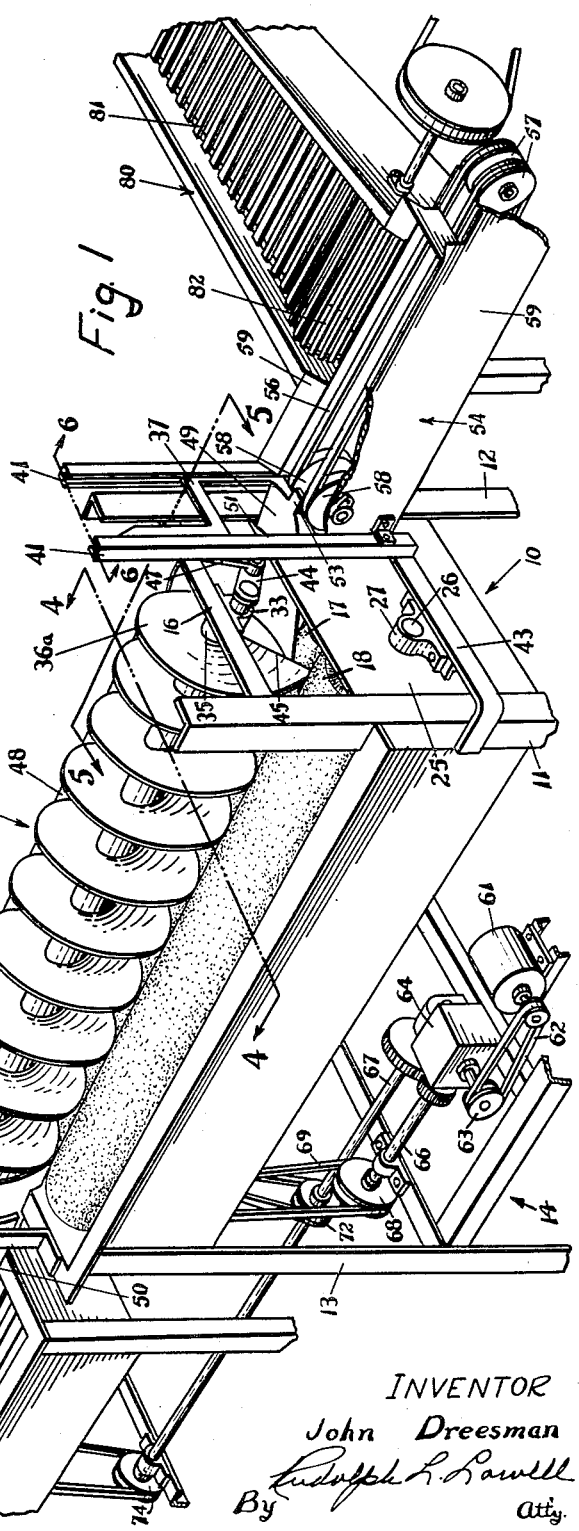
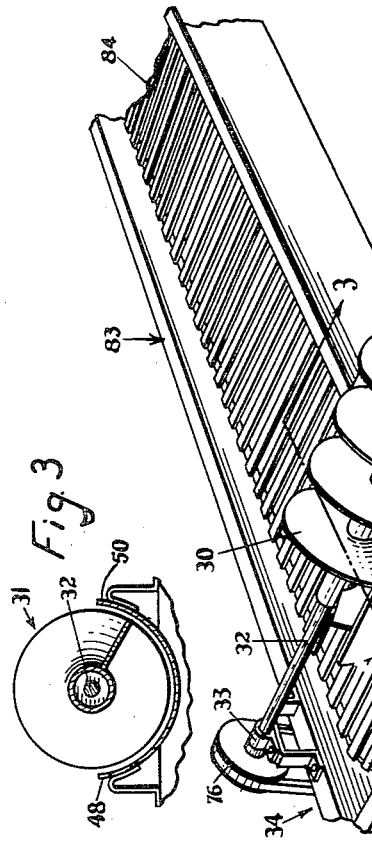
INVENTOR
John Dreesman
By Rudolph L. Lowell
Atty.

Oct. 5, 1954
J. DREESMAN
2,690,576
MACHINE FOR REMOVING FOREIGN MATERIAL
FROM THE OUTER SURFACE OF EGGS
Filed Dec. 13, 1948
2 Sheets-Sheet 2
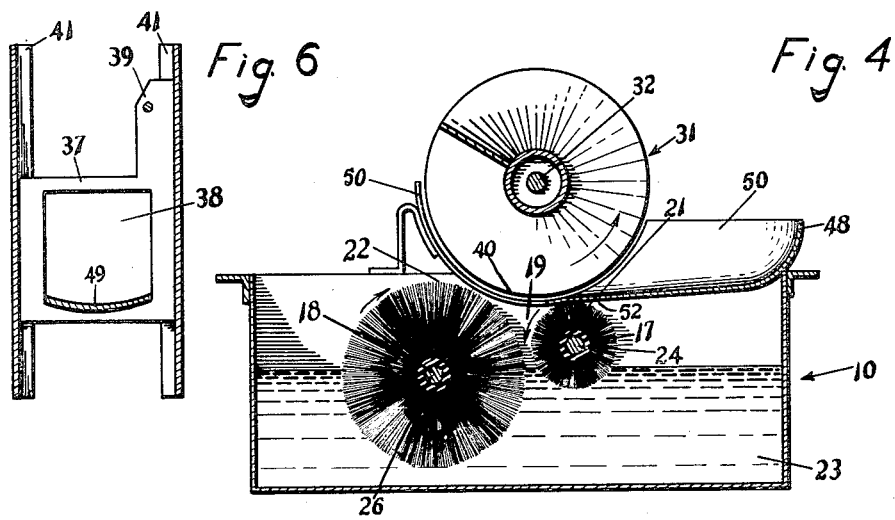
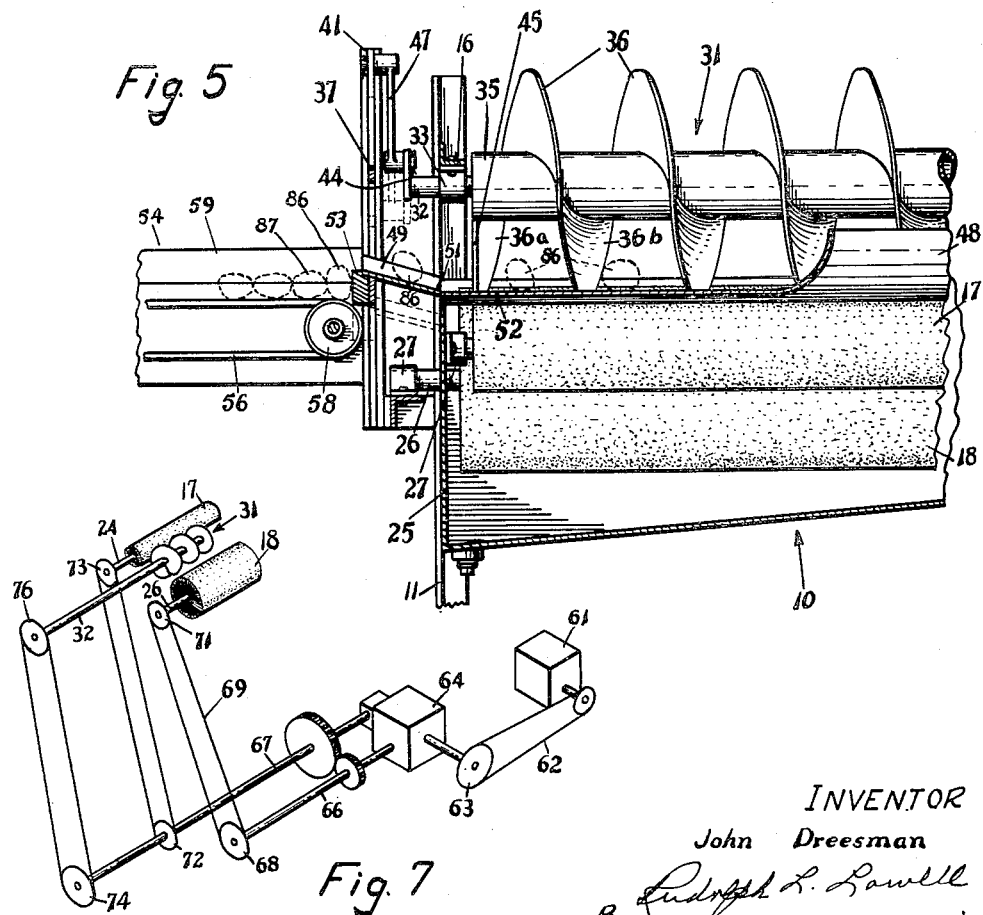
INVENTOR
John Dreesman
By Rudolph L. Lowell
Atty.

Patented Oct. 5, 1954

2,690,576

UNITED STATES PATENT OFFICE 2,690,576

MACHINE FOR REMOVING FOREIGN MATERIAL FROM THE OUTER SURFACE OF EGGS

John Dreesman, Algona, Iowa

Application December 13, 1948, Serial No. 64,965

1 Claim. (Cl. 15—3.15)

This invention relates generally to washing machines and in particular to a machine for removing foreign material from the outer surface of an egg.

An object of this invention is to provide an improved egg washing machine.

A further object of this invention is to provide an egg washing machine capable of acting on the complete outer surface of an egg to remove all foreign material therefrom.

Another object of this invention is to provide an egg washing machine for continuously washing eggs in succession such that each egg is individually acted upon for a predetermined time period.

Still a further object of this invention is to provide an egg washing machine adapted to act on eggs individually, gently and in succession so as to reduce egg breakage and crackage to a minimum.

A feature of this invention is found in the provision of an egg washing machine in which a pair of rotary brushes are arranged longitudinally of a wash tank so as to form an egg receiving trough therebetween. A screw conveyor is positioned above the trough such that its lower side acts to move eggs longitudinally of the trough. An egg feeder, synchronized with the screw conveyor, is constructed to feed eggs in succession from an egg supply conveyor, so that only a single egg is disposed between adjacent pairs of flights on the screw conveyor.

Yet another feature of this invention is found in the provision of an egg washing machine in which a vertically reciprocating feed member, disposed between a horizontal egg supply conveyor and a washing trough formed between a pair of rotary brushes, is provided with an egg receiving portion adapted, when in its lower position, to receive an egg from the supply conveyor, and to feed such egg to the washing trough, when in its upper position. The feed member, concurrently with admitting an egg to the trough, has a stop portion adapted to extend across the discharge end of the supply conveyor so as to hold the eggs on the conveyor from being discharged.

Further objects, features and advantages of this invention will become apparent from the following description when taken in connection with the accompanying drawings in which:

Fig. 1 is a foreshortened perspective view of the egg washing machine of this invention;

Fig. 2 is a fragmentary plan view of the machine showing the egg feeding means therefor;

Fig. 3 is a transverse sectional view taken along the line 3—3 in Fig. 1;

Fig. 4 is a transverse sectional view as seen along the line 4—4 in Fig. 1, showing the relative assembly of a pair of rotary brushes and a screw conveyor for moving eggs longitudinally of the brushes;

Fig. 5 is a longitudinal sectional view as seen along the line 5—5 in Fig. 1;

Fig. 6 is a detail sectional view of the egg feeding means taken along the line 6—6 in Fig. 1; and Fig. 7 is a diagrammatic perspective view of the power transmitting mechanism for the egg washing machine of this invention.

With reference to the drawings the egg washing machine of this invention is illustrated in Fig. 1 as including a wash tank 10 of a substantially rectangular shape having supporting legs 11, 12 and 13 (and a fourth leg which is not illustrated), suitably connected adjacent their lower ends by a brace structure indicated generally as 14. The legs 11 and 12 are projected upwardly above the top level of the tank 10, and are connected together adjacent their top ends by a brace member 16.

Arranged within the tank 10 and extended longitudinally thereof are a pair of rotary washing brushes 17 and 18 (Figs. 1 and 4) with the brush 17 being of a smaller diameter than the brush 18. The brushes 17 and 18 are relatively arranged in a side by side relation so as to form therebetween an egg receiving trough or a washing zone indicated at 19. As best appears in Fig. 4 the top side 21 of the smaller brush 17 is at a level below the top side 22 of the large brush 18 for a purpose which will appear later. The brushes 17 and 18 are rotated in opposite directions, as indicated by the arrows in Fig. 4, so that an egg received in the trough 19 tends to be moved downwardly by both brushes 17 and 18 whereby to accomplish a tumbling action on an egg during a washing operation. The tank 10 is filled with a suitable cleaning liquid 23 to a level providing for the submersion in the liquid of the lower sides of the brushes 17 and 18, so that the brushes 17 and 18 function as carriers for supplying the cleaning liquid into the washing zone or trough 19. The shafts 24 and 26 for the brushes 17 and 18, respectively, are suitably supported in bearings 27 provided near the end walls of the tank 10, with only the end wall 25 being illustrated.

The eggs to be cleaned are moved longitudinally of the trough or washing zone 19, between the brushes 17 and 18, by the provision of a spiral conveyor 31 arranged longitudinally of the tank 10 (Figs. 1 and 4), at a position such that its shaft 32 is disposed above the trough and its lower side 40 is closely adjacent to the top sides 21 and 22 of the rotary brushes 17 and 18, respectively. The conveyor shaft 32, at what might be termed the inlet or feed end 35 of the screw conveyor 31, is rotatably supported in a bearing 33 (Figs. 1 and 5) carried from the brace member 16. The shaft at the discharge end 30 of the screw conveyor 31, is rotatably supported in a bearing 33 carried on a frame structure, indicated generally as 34, and forming part of an egg drying mechanism 83.

An egg to be washed is disposed between an adjacent pair of flights 36 of the conveyor 31 so that on rotation of the conveyor 31 an egg is moved longitudinally of the trough 19 from the feed end 35 to the discharge end 30 of the conveyor.

The eggs to be washed are separately fed into the trough 19 for positioning between an adjacent pair of the screw flights 36 by means including a vertically reciprocating slide or feed member 37 (Figs. 1, 2, 5 and 6) having a flat body member of a substantially rectangular shape formed with a center rectangular opening 38 and an upright connecting arm 39. The slide member 37 is guidably supported for up and down movement between a pair of spaced upright tracks or ways 41 of a channel shape in transverse cross section. The lower ends of the upright guides 41 are suitably secured as by welding or by like means to a transverse bracket member 43 connected between the legs 11 and 12 for the wash tank 10 at a position adjacent to and opposite the feed end 35 of the screw conveyor 31.

Reciprocal movement of the slide member 37 is accomplished by the provision of means including a crank arm 44 (Figs. 1, 2 and 5) mounted on the shaft 32 to the outside of the shaft bearing 33. A connecting rod 47 is pivotally connected to the free end of the crank arm 44 and to the outer or upper end of the upright connecting arm 39 of the slide member 37. The crank arm 44, connecting rod 47, and the upright arm 39 are relatively arranged and constructed to provide for a synchronized movement of the slide member 37 relative to the rotative movement of the screw flights 36 for a purpose to appear later. In other words, the movement of the slide or feed member 37 operates synchronously with the rotary movement of the screw conveyor 31, and in particular with the leading edge 45 of the screw flight indicated as 36(a) at the feed end 35 of the conveyor 31.

Extended longitudinally of the wash tank 10 and along that side of the conveyor 31 at which the flights 36 move upwardly (Figs. 1 and 4) is a guard or shield member 48 of an outwardly and upwardly curved shape having its lower end 52 terminating at substantially the top side 21 of the small rotary brush 17. The guard 48, as best appears in Figs. 2 and 4, has the portion 50 thereof opposite the feed end 35 of the screw conveyor 31 flared or diverged outwardly and terminating at the side wall 25 of the wash tank 10. The discharge end 30 of the conveyor 31 extends outwardly from the wash tank 10 and at such end the guard 48 (Fig. 3) forms one side of a trough member 50 constructed integral with the guard 48 and constituting an extension of the trough 19 formed between the rotary brushes 17 and 18.

The slide or feed member 37 (Figs. 1, 2 and 5) is provided with what might be termed a chute or egg receiving member 49 inclined downwardly and inwardly from the lower side of the slide member opening 38 to a position adjacent the end wall 25 of the wash tank. The inclination of the chute or egg receiving member 49 is such that when the slide member 37 is in its uppermost position shown in full lines in Fig. 5, the lower end 51 of the chute is substantially at the level of the lower end 52 of the guard member 48. Arranged below the chute member 49 and projected outwardly from the slide member 37 is a stop or baffle member 53 for a purpose to appear later.

Eggs are supplied to the slide or feed member 37 from a horizontally arranged supply conveyor, indicated generally as 54, and including a pair of spaced V-belts 56 connected between oppositely arranged pairs of V-belt pulleys 57 and 58. The V-belts 56 (Figs. 1 and 2) are spaced a distance apart to provide for the carrying of an egg on the upper lengths thereof, with the pulleys 58 being arranged adjacent to the feed member 37 such that the stop member 53 is movable therebetween. As shown in Fig. 5, the upper lengths of the V-belts 56 are arranged substantially in a plane common to the plane of the lower edge 52 of the guard 48 so as to be in substantially the plane of the trough or washing zone 19. Side guards 59 are suitably arranged to opposite sides of the V-belts 56 so as to retain an egg in a supported position on the V-belts.

The machine is equipped with a drive motor 61 suitably mounted on the brace structure 14 and connected through means including a V-belt 62 and pulley 63 with a gear reduction unit 64 (Figs. 1 and 7). The reduction unit 64 is provided with a pair of drive shafts 66 and 67. A pulley 68 mounted on the drive shaft 66 is connected through a V-belt 69 with a pulley 71 carried on the shaft 26 of the large rotary brush 18. A first pulley 72 mounted on the drive shaft 67 is belt connected with a pulley 73 on the shaft 24 for the small rotary brush 17. A second pulley 74 on the drive shaft 67 is belt connected with a pulley 76 mounted on that section of the shaft 32 which is extended from the discharge end 30 of the conveyor 31.

It is thus seen that the brushes 17 and 18 and conveyor 31 are operated from the single motor 61, and with the slide or feed member 37 being driven directly in a synchronized relation with the conveyor 31. It is contemplated that the speed ratio between these various movable members be such that the small brush 17 has a speed of about 20 R. P. M., the large brush 18 about 300 R. P. M., and the spiral about 72 R. P. M. The difference in the relative speed of the rotary brushes 17 and 18 provides for a more thorough scrubbing or washing action on the eggs admitted to the trough 19. Further, by virtue of the difference in the relative diameters of the brushes 17 and 18, there is more give or flexibility to the bristles on the brush 18 than on the brush 17 with the bristles on the small brush 17 being such that they are substantially without any flexible action. This variation in the relative stiffness of the bristles on the brushes 17 and 18 eliminates any tendency of eggs carried in the trough 19 being carried downwardly between the two rotary brushes.

In the operation of the egg washing machine of this invention it is contemplated that eggs be continuously supplied to the horizontal supply conveyor 54, fed successively by the feed member 37 into the trough 19, and then discharged continuously from the discharge end 30 of the conveyor 31. For this purpose, and with reference to Fig. 1, a soak tank 80 is provided with a conveyor 81 having its discharge end 82 arranged so as to eject eggs directly onto the top lengths of the V-belts 56 of the supply conveyor 54. The egg drier 83 is equipped with a conveyor 84 positioned to receive eggs directly from the trough 50 at the discharge end 30 of the screw conveyor 31.

The eggs on the conveyor 54 are carried to the feed member 37 which has a stroke such that in its uppermost position, illustrated in Fig. 5, the stop member 53 is positioned between the pulleys 58 substantially in line with the top lengths of the V-belts 56. When the feed member 37 is in its lowermost position, illustrated in dotted lines in Fig. 5, the stop 53 is moved between the pulleys 58 so that the upper end of the chute member 49 is substantially in line with the top lengths of the V-belts 56.

When the feed member 37 is in its lowermost position the leading egg on the supply conveyor 54, indicated at 86 (Fig. 5) is discharged from the conveyor 54 into the chute or egg-receiving member 49 and is retained on the chute by the tank end wall 25. However, before the next adjacent egg 87 is advanced to a position for discharge into the chute member 49, the feed member 37 is moved upwardly so that the egg 87, along with the remaining eggs on the conveyor 54, is retained against movement by the stop member 53. In other words, when the stop member 53 is in line with the upper lengths of the V-belts 56, the eggs on the supply conveyor 54 are held against movement into the feed member 37, but the V-belts 56 continue to move due to slippage therebetween and the eggs.

On upward movement of the chute 49 to its full line position shown in Fig. 5, the egg 86, which was retained thereon by the end wall 25 of the tank 10, is free to move by the action of gravity into the flared end 50 of the shield 48. As previously explained, the reciprocal movement of the feed member 37 is in a timed relation relative to the screw conveyor 31, so that as the egg 86 drops onto the flared end 50 of the guide 48, the space between the adjacent flights 36(a) and 36(b) at the feed end 35 of the conveyor 31 is open and free to receive the egg 86 therebetween. This action of the feed member 37 is repeated in succession for the remaining eggs on the conveyor 54. It is thus seen that the feed member has a double function, namely, it operates to receive and feed a single egg from the supply conveyor 54 to the conveyor 31 during each complete cycle of movement thereof, and during such feeding action acts as a stop to hold remaining eggs on the supply conveyor 54 from being fed into the feed member.

By virtue of this action of the feed member 37, only a single egg is disposed between adjacent flights 36 of the conveyor 31, for movement longitudinally of the trough 19 toward the discharge end 30 of the conveyor 31. The eggs are thus positively retained against striking each other during a washing action and are individually handled concurrently with being progressively moved along the brushes 17 and 18. As an egg approaches the discharge end 30 of the conveyor 31, it is moved by the conveyor 31 into the trough 50 for discharge directly onto the conveyor 84 of the drying mechanism 83.

It is readily apparent that the duration of the washing period for each egg may be readily varied by merely changing the speed of rotation of the conveyor 31. Likewise, the intensity or severity of the washing or scrubbing action by the brushes 17 and 18 may be varied by changing the relative speed of rotation between the brushes. The machine is thus capable of continuously washing eggs in succession, and with each egg being individually handled during a washing operation. Further, since the conveyor 31 and feed member 37 are directly connected for operation in a timed relation, a positive feeding of an egg between adjacent flights 36 of the conveyor 31 is readily maintained.

From a consideration of the above description it is seen that the invention provides a washing machine which eliminates entirely any manual handling of the eggs during a washing operation and requires an attendant only to supply eggs to the conveyor 81 of the soaking tank 80, and for removing eggs from the conveyor 84 of the drying mechanism 83. Further, the machine is of a simple and compact construction, and has only a relatively few number of working parts, all of which are readily accessible for servicing and maintenance purposes.

Although the invention has been described and illustrated with respect to a preferred embodiment thereof, it is to be understood that it is not to be so limited since changes and modifications can be made therein all within the intended scope of this invention as defined by the appended claim.

I claim:

In an egg washing machine comprising a wash tank having a liquid therein, a pair of rotary washing brushes arranged longitudinally of said tank in a transversely spaced relation so as to form an egg receiving trough therebetween, with one of said brushes having bristles of a length substantially twice the length of the bristles on the other one of said brushes, means supporting said brushes on the tank so that the lower side portions of said brushes are below the level of the liquid in the tank, means for rotating said brushes in opposite directions such that the top side portions of the brushes are moved toward each other and with said larger brush being rotated at a substantially faster rate of speed than said smaller brush, a rotary screw conveyor for moving eggs longitudinally of said trough, means supporting said conveyor in a parallel spaced relation with said brushes at a position above said trough and sufficiently close to the trough to contact and move the eggs along the trough, and means for successively feeding eggs to said conveyor such that only a single egg is disposed between adjacent flights on said conveyor.

References Cited in the file of this patent

UNITED STATES PATENTS

| Number | Name | Date |
| --- | --- | --- |
| 1,115,142 | Wirtz | Oct. 27, 1914 |
| 1,423,059 | Williamson | July 18, 1922 |
| 1,530,415 | Roussel | Mar. 17, 1925 |
| 1,684,896 | Stebler | Sept. 18, 1928 |
| 1,694,675 | White | Dec. 11, 1928 |
| 2,102,340 | Van Wyk | Dec. 14, 1937 |
| 2,147,333 | Dahlberg | Feb. 14, 1939 |
| 2,357,892 | Grant | Sept. 12, 1944 |